US012532102B2

(12) United States Patent
Pang et al.

(10) Patent No.: US 12,532,102 B2
(45) Date of Patent: Jan. 20, 2026

(54) CHARGING CASE FOR WIRELESS EARBUDS AND WIRELESS EARBUD ASSEMBLY

(71) Applicant: Nothing Technology Limited, London (GB)

(72) Inventors: Yanwu Pang, London (GB); Huan Cai, London (GB)

(73) Assignee: Nothing Technology Limited, London (GB)

( * ) Notice: Subject to any disclaimer, the term of this patent is extended or adjusted under 35 U.S.C. 154(b) by 150 days.

(21) Appl. No.: 18/596,425

(22) Filed: Mar. 5, 2024

(65) Prior Publication Data

US 2024/0314483 A1 Sep. 19, 2024

(30) Foreign Application Priority Data

Mar. 15, 2023 (CN) ......................... 202310250799.9

(51) Int. Cl.
*H04R 1/10* (2006.01)

(52) U.S. Cl.
CPC ......... *H04R 1/1025* (2013.01); *H04R 1/1016* (2013.01); *H04R 2420/07* (2013.01)

(58) Field of Classification Search
CPC ............... H04R 1/1025; H04R 1/1016; H04R 2420/07; H04R 2201/10; H04R 2460/17; H02J 7/0042; H02J 7/0044
See application file for complete search history.

(56) References Cited

U.S. PATENT DOCUMENTS

| | | | | |
|---|---|---|---|---|
| 9,532,128 B2 * | 12/2016 | Lindén | ................. | H04R 1/1025 |
| 10,966,012 B2 * | 3/2021 | Lindén | ................. | H04R 1/1025 |
| 2016/0261676 A1 * | 9/2016 | Nishimoto | .............. | H04L 67/06 |
| 2017/0245039 A1 * | 8/2017 | Chen | ................... | H01M 50/216 |

FOREIGN PATENT DOCUMENTS

CN 110958530 A 4/2020

OTHER PUBLICATIONS

A video clip retrieved at https://www.youtube.com/watch?v=XSAfOYk89tl.

* cited by examiner

*Primary Examiner* — Jason R Kurr
(74) *Attorney, Agent, or Firm* — IPro, PLLC

(57) ABSTRACT

Provided are a charging case for wireless earbuds and a wireless earbud assembly. The charging case for wireless earbuds includes an outer housing assembly, an inner housing, and a detachable mechanism. The outer housing assembly and the inner housing are configured to rotate relative to each other, and a slot is disposed in the outer housing assembly. The detachable mechanism includes a rotating base, an elastic snap-fit member, and a rotating shaft. The rotating base is at least partially exposed outside the outer housing assembly, the rotating shaft is connected to the rotating base and is rotatably connected to the inner housing, and the elastic snap-fit member is disposed on the rotating base.

20 Claims, 12 Drawing Sheets

CHARGING CASE FOR WIRELESS EARBUDS AND WIRELESS EARBUD ASSEMBLY

CROSS-REFERENCE TO RELATED APPLICATION

This application claims priority to Chinese Patent Application No. 202310250799.9, filed Mar. 15, 2023, the content of which is hereby incorporated by reference in its entirety.

TECHNICAL FIELD

The present disclosure relates to the technical field of wireless earbuds, and in particular, to a charging case for wireless earbuds and a wireless earbud assembly.

BACKGROUND

True wireless stereo (TWS) earbuds have a compact structure due to no connection wires in a traditional sense, which can improve user experience, and therefore, TWS earbuds have been developed rapidly. In order to prolong a service duration of wireless earbuds, a charging case for wireless earbuds appears, which not only can accommodate the wireless earbuds, is easy to carry around, but also can charge the wireless earbuds when the wireless earbuds are accommodated. Therefore, the wireless earbuds with the charging case for wireless earbuds become a more general configuration in the wireless earbuds.

Currently, an opening manner of the charging case for wireless earbuds generally includes three forms: a flip form, a slide form, and a rotation form. A rotating-type charging case generally has an inner housing and an outer housing rotating relative to each other. Because a rotation gap exists between the outer housing and the inner housing, dust or contamination easily enters the rotation gap, which makes it inconvenient to clean the dust in the rotation gap. After the rotating-type charging case is used for a long time, rotation stunning and an adverse effect on appearance are easily caused, resulting in poor user experience.

SUMMARY

The present disclosure provides a charging case for wireless earbuds. The charging case for wireless earbuds includes an inner housing, an outer housing assembly, and a detachable mechanism. The outer housing assembly is configured to rotate relative to the inner housing, the outer housing assembly defining a slot. The detachable mechanism includes a rotating base, an elastic snap-fit member, and a rotating shaft. The rotating base is at least partially exposed outside the outer housing assembly, the rotating shaft is connected to the rotating base and is rotatably connected to the inner housing, and the elastic snap-fit member is disposed on the rotating base. When the rotating base rotates by a first angle, the elastic snap-fit member rotates out of the slot, and the outer housing assembly and the inner housing are detachable; or when the rotating base rotates by a second angle, the elastic snap-fit member and the slot are snap-fitted, and the outer housing assembly and the inner housing are not detachable.

The present disclosure provides a wireless earbud assembly. The wireless earbud assembly includes wireless earbuds and a charging case for wireless earbuds. The charging case for wireless earbuds includes an inner housing, an outer housing assembly, and a detachable mechanism. The outer housing assembly is configured to rotate relative to the inner housing, the outer housing assembly defining a slot. The detachable mechanism includes a rotating base, an elastic snap-fit member, and a rotating shaft. The rotating base is at least partially exposed outside the outer housing assembly, the rotating shaft is connected to the rotating base and is rotatably connected to the inner housing, and the elastic snap-fit member is disposed on the rotating base. When the rotating base rotates by a first angle, the elastic snap-fit member rotates out of the slot, and the outer housing assembly and the inner housing are detachable; or when the rotating base rotates by a second angle, the elastic snap-fit member and the slot are snap-fitted, and the outer housing assembly and the inner housing are not detachable.

BRIEF DESCRIPTION OF THE DRAWINGS

To describe technical solutions of embodiments of the present disclosure more clearly, the following will briefly introduce accompanying drawings required for describing the embodiments. It is to be understood that the accompanying drawings hereinafter described are some embodiments of the disclosure and are therefore not to be considered to limit the scope. Based on these drawings, those of ordinary skill in the art can also obtain other drawings without creative effort.

KEY COMPONENTS NOTIFICATION

Figure 1:
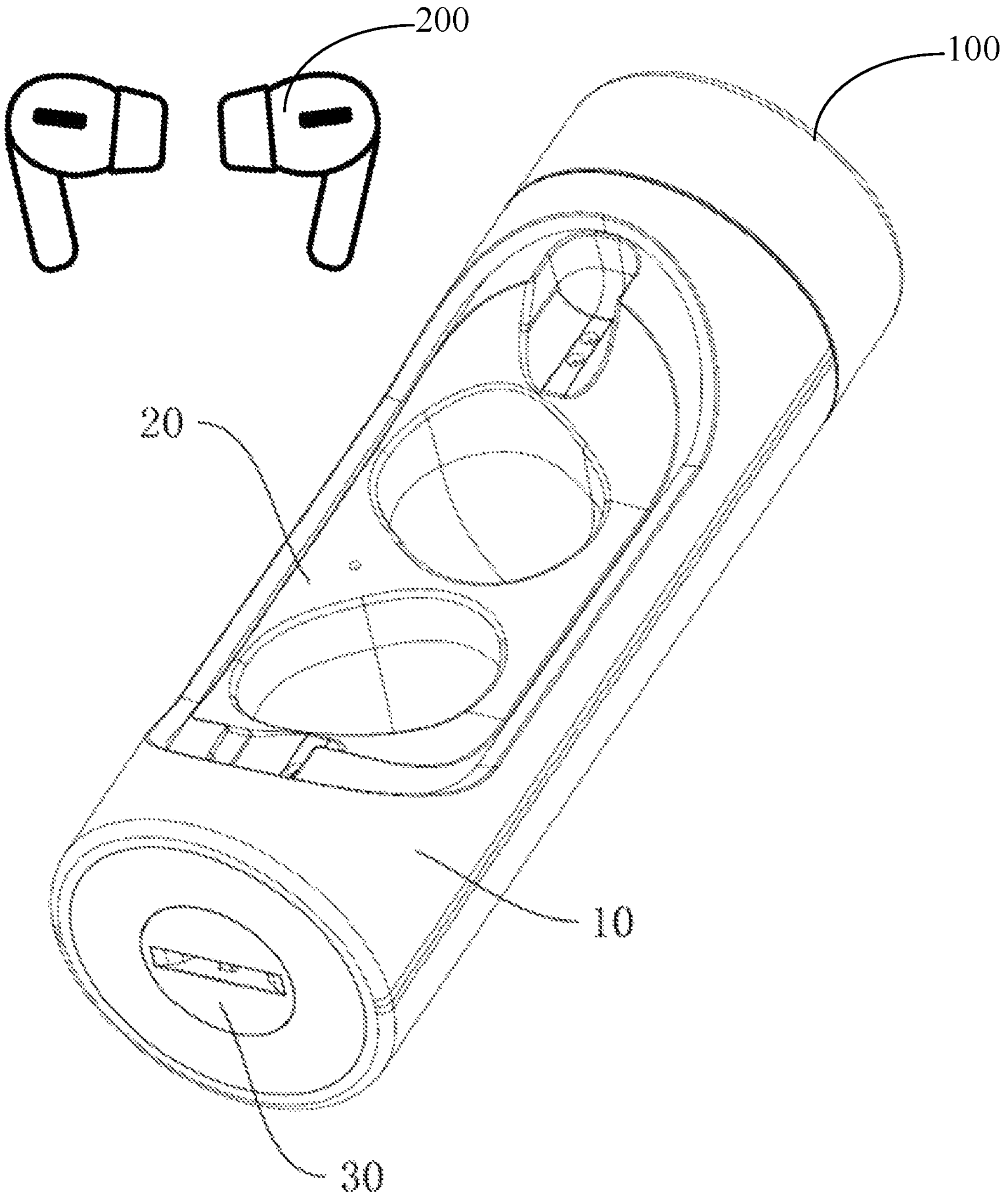
FIG. 1 is a perspective schematic structural view of a wireless earbud assembly provided in an embodiment of the present disclosure.

100—charging case for wireless earbuds; 10—outer housing assembly; 11—outer housing; 111—accommodating cavity; 112—accommodating opening; 12—annular decoration member; 121—detachment opening; 122—slot; 1221—first slot; 1222—second slot; 1223—opening; 1224—limiting portion; 123—snap-fit block; 20—inner outer housing assembly; 21—inner housing; 211—earbud cavity; 22—rotating cap; 30—detachable mechanism; 31—rotating base; 311—rotating plate; 312—fixing bracket; 3121—sliding slot; 3122—fixing column; 313—detachment portion; 3131—detachment groove; 32—elastic snap-fit member; 321—elastic member; 321*a*—fixing portion; 321*b*—elastic portion; 3211—fixing hole; 322—snap-fit member; 3221—snap-fit opening; 33—rotating shaft; 331—rotating member; 34—fixing member; 40—bushing mechanism; 41—limiting plate; 411—fixing slot; 42—outer rotating ring; 43—ball; 44—inner rotating ring; 441—limiting groove; 50—magnetic assembly; 51—first magnetic member; and 52—second magnetic member.

DETAILED DESCRIPTION

The following will describe embodiments in detail, and examples of embodiments herein will be illustrated in the accompanying drawings, in which the same or similar reference numerals denote the same or similar components or components having the same or similar functions throughout the context. Embodiments described hereinafter with reference to the accompanying drawings are illustrative and intended for explaining, rather than limiting, the present disclosure.

It should be understood that directional relationship or positional relationship indicated by terms such as “center”, “longitudinal”, “lateral”, “length”, “width”, “thickness”, “on”, “under”, “front”, “back”, “left”, “right”, “vertical”, “horizontal”, “top”, “bottom”, “in”, “out”, “clockwise”, “anticlockwise”, “axial”, “radial”, “circumferential”, and the like is directional relationship or positional relationship based on accompanying drawings and are only for the convenience of description and simplicity, rather than explicitly or implicitly indicate that apparatuses or components referred to herein must have a certain direction or be configured or operated in a certain direction and therefore cannot be understood as limitation on the disclosure.

In addition, terms “first”, “second”, and the like are only used for description and cannot be understood as explicitly or implicitly indicating relative importance or implicitly indicating the number of technical features referred to herein. Therefore, features restricted by terms “first”, “second”, and the like can explicitly or implicitly include one or more of the features. In the context of the disclosure, unless stated otherwise, “multiple” refers to two or more than two.

Unless stated otherwise, in the disclosure, terms “installing”, “coupling”, “connecting”, “fixing”, and the like referred to herein should be understood in broader sense. For example, coupling may be a fixed coupling, a removable coupling, or an integrated coupling, may be a mechanical coupling, an electrical coupling, and may be a direct coupling, an indirect coupling through a medium, or a communication coupling between two components or an interaction coupling between two components, unless stated otherwise. For those of ordinary skill in the art, the above terms in the present disclosure can be understood according to specific situations.

Unless stated otherwise, in the disclosure, a first feature being “on” or “under” a second feature referred to herein can refer to a direct contact between the first feature and the second feature or an indirect contact between the first feature and the second feature via a medium. In addition, the first feature being “above”, “over”, and “on” the second feature can be the first feature being right above or obliquely above the second feature or only refers to the first feature being at a higher horizontal level than the second feature. The first feature being “below”, “underneath”, and “under” the second feature can be the first feature being right below or obliquely below the second feature or only refers to the first feature being at a lower horizontal level than the second feature.

Embodiment 1

As illustrated in FIG. 1, an embodiment of the present disclosure provides a wireless earbud assembly, which includes wireless earbuds 200 and a charging case for wireless earbuds 100. The charging case 100 for wireless earbuds is provided with a detachable mechanism 30, so that when the charging case 100 for wireless earbuds requires cleaning, users can disassemble it themselves to clean the interior of the charging case 100 for wireless earbuds, so that the structure is simple, and the user experience is improved.

Figure 2:
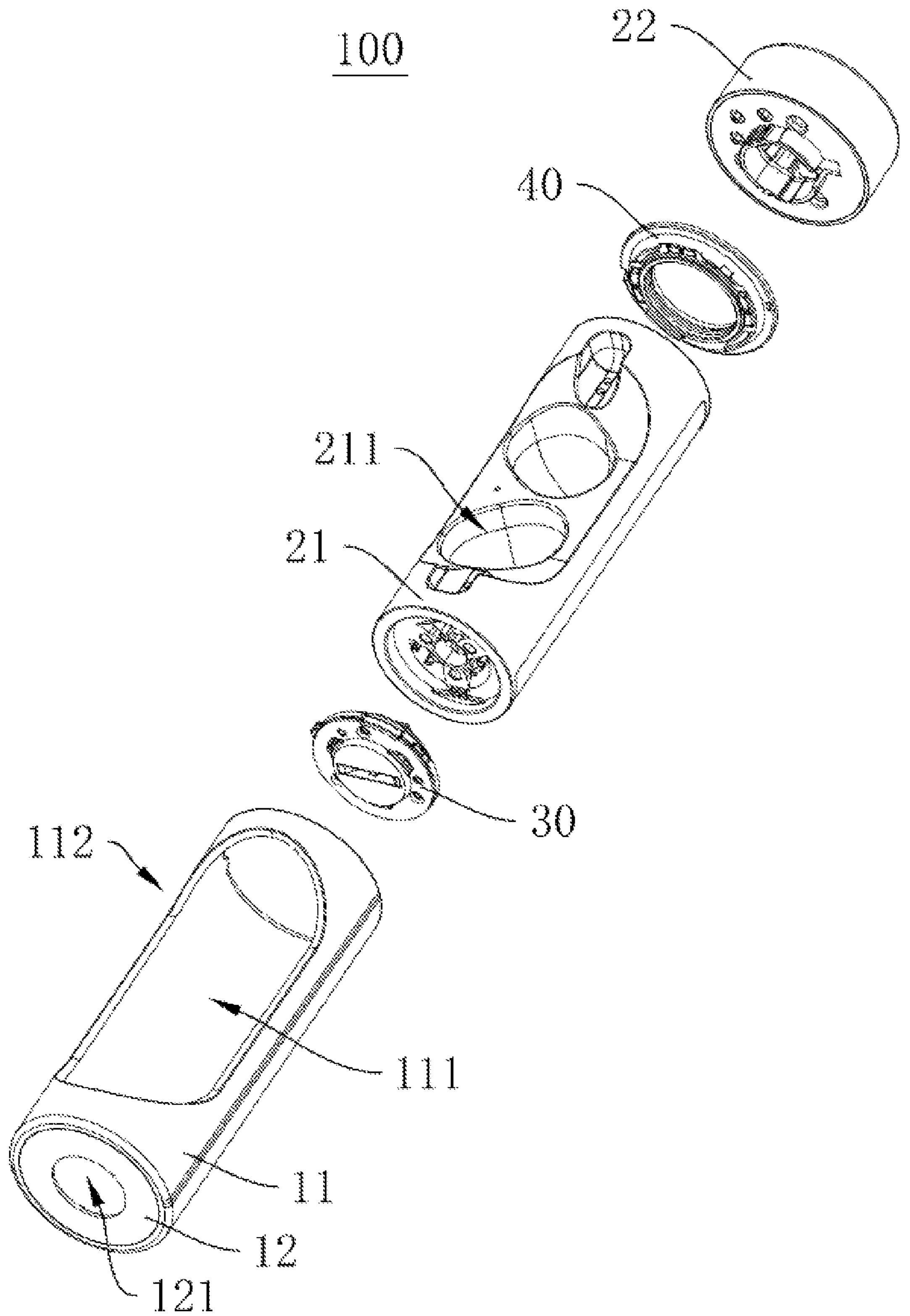
FIG. 2 is a partial exploded schematic structural view of the charging case for wireless earbuds illustrated in FIG. 1.

As illustrated in FIG. 2, the charging case 100 for wireless earbuds includes an outer casing assembly 10, an inner casing assembly 20, and a detachable mechanism 30. The inner housing assembly 20 is configured to accommodate wireless earbuds, and the outer housing assembly 10 is configured to wrap the inner housing assembly 20 and the wireless earbuds. The inner housing assembly 20 is at least partially disposed in the outer housing assembly 10, and the detachable mechanism 30 is disposed in the outer housing assembly 10 and at least partially exposed outside the outer housing assembly 10. The inner housing assembly 20 is rotatably connected to the detachable mechanism 30 through a rotating shaft 33. The detachable mechanism 30 is detachably connected to the outer housing assembly 10, so that the inner housing assembly 20 is detachably connected to the outer housing assembly 10.

By means of the detachable mechanism 30, the outer housing assembly 10 and the inner housing assembly 20 can be separated, thereby facilitating cleaning, replacement, and maintenance of the outer housing assembly 10 or the inner housing assembly 20.

Specifically, the outer housing assembly 10 and an inner housing 21 are disposed to rotate relative to each other, the outer housing assembly 10 defines a slot 122. The detachable mechanism 30 includes a rotating base 31, an elastic snap-fit member 32, and a rotating shaft 33. The rotating base 31 is at least partially exposed outside the outer housing assembly 10, the rotating shaft 33 is connected to the rotating base 31 and is rotatably connected to the inner housing 21, and the elastic snap-fit member 32 is disposed on the rotating base 31.

When the rotating base 31 rotates by a first angle, the elastic snap-fit member 32 rotates out of the slot 122, and the outer housing assembly 10 and the inner housing 21 are detachable; or when the rotating base 31 rotates by a second angle, the elastic snap-fit member 32 and the slot 122 are snap-fitted, and the outer housing assembly 10 and the inner housing 21 are not detachable.

Figure 14:
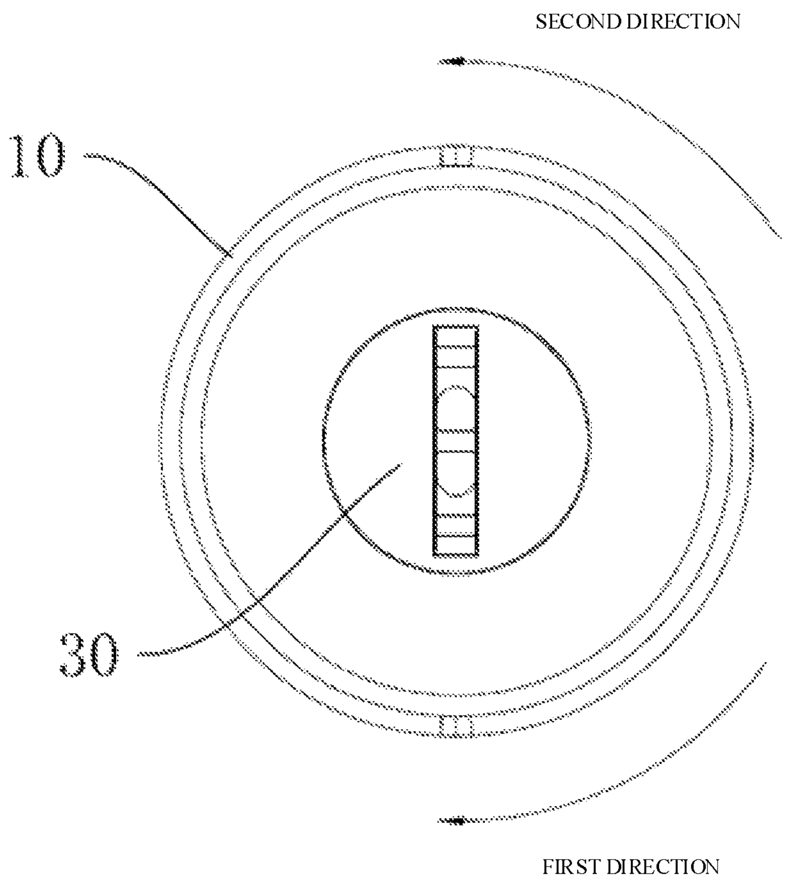
FIG. 14 is a schematic structural view of the charging case for wireless earbuds illustrated in FIG. 1, viewed from a direction.

As illustrated in FIG. 14, it can be noted that the rotating base 31 may rotate by a first angle in a first direction and by a second angle in a second direction, and the first direction and the second direction may be the same or opposite. Exemplarily, the first direction is a clockwise direction, and the second direction is a counterclockwise direction. Certainly, in other embodiments, both the first direction and the second direction may be clockwise directions or both the first direction and the second direction may be counterclockwise directions, which are specifically set according to the number of the slots 122.

The inner housing assembly 20 is rotatably disposed in the outer housing 11 through the detachable mechanism 30. When inner housing assembly 20 needs to be detached, the inner housing assembly 20 and the detachable mechanism 30 can be extracted from the outer housing assembly 10 by separating the detachable mechanism 30 from the outer housing assembly 10.

In an embodiment, multiple slot 122 are defined, and the multiple slots 122 are defined on the outer housing assembly 10 along a circumferential direction of the rotating base 31, and the number of the elastic snap-fit members 32 is equal to the number of the slots 122.

Exemplarily, three slot 122 are defined, and the three slot 122 are defined on the outer housing assembly 10 at equal intervals along the circumferential direction of the rotating base 31. Correspondingly, the number of the elastic snap-fit members 32 is also three. One elastic snap-fit member 32 is correspondingly snap-fitted with one snap slot 122 to form a snap-fit point; and the connecting lines of the three snap-fit points define a triangle, so that the detachable mechanism 30 and the outer housing assembly 10 are a snap-fitted more stably and reliably. Definitely, the number of the slots 122 may also be set to two, four, five, or the like, which is specifically adjusted according to product requirements.

Exemplarily, in an embodiment in which multiple slots 122 are defined, the first angle and the second angle may be selected as 30°, and certainly, the first angle and the second angle may also be selected as 13°, 28°, 40°, 45°, or the like, which are specifically set according to product requirements.

In an embodiment, the slot 122 includes a first slot 1221 and a second slot 1222 which are connected and orthogonal to each other, and one end of the first slot 1221 extends to define an opening 1223, and the elastic snap-fit member 32 is able to move out of the slot 122 from the opening 1223. The other end of the first slot 1221 is connected to one end of the second slot 1222. The first slot 1221 is provided with a limiting portion 1224 on a slot wall of the first slot 1221 relative to the second slot 1222, and the limiting portion 1224 is configured to stop the elastic snap-fit member 32 from rotating continuously.

In an embodiment, when the elastic snap-fit member 32 is engaged with the slot 122, one end of the elastic snap-fit member 32 is engaged with the second slot 1222, the rotating base 31 is driven to rotate by a first angle, the one end of the elastic snap-fit member 32 moves from the second slot 1222 to the first slot 1221 until the one end of the elastic snap-fit member 32 abuts against the limiting portion 1224, and the one end of the elastic snap-fit member 32 corresponds to the opening 1223, so that the detachable mechanism 30 can be exacted from the outer housing assembly 10, to realize a detachment function. In addition, the limiting portion 1224 can prevent the rotating base 31 from rotating continuously after rotating by the first angle, so that the one end of the elastic snap-fit member 32 can correspond to the opening 1223, which facilitates detachment.

In the above embodiment, the elastic snap-fit member 32 defines a snap-fit opening 3221, and the second slot 1222 is provided with a snap-fit block 123 on a wall surface of the second slot 1222 away from the first slot 1221, and the snap-fit block 123 is in fit with the snap-fit opening 3221. When the elastic snap-fit member 32 is engaged with the slot 122, the snap-fit block 123 is in fit with the snap-fit opening 3221, and the snap-fit block 123 is engaged with the snap-fit opening 3221, so that the elastic snap-fit member 32 is more engaged with the slot 122.

In another embodiment, one slot 122 is disposed, the slot 122 is an annular slot, and the annular slot defines an opening 1223 for the elastic snap-fit member 32 to move out of the annular slot. In this embodiment, the number of the slot 122 is one, and the number of the elastic snap-fit members 32 may be one or more. Exemplarily, one elastic snap-fit member 32 is disposed, and in this case, the rotating base 31 may rotate by 30°, 40°, 50°, 120°, 180°, etc. along the circumferential direction of the outer housing assembly 10 during rotation.

Further, the snap-fit block 123 has a snap-fit end which has an arc structure, and correspondingly, the shape of the snap-fit opening 3221 matches the shape of the snap-fit block 123. The arc structure facilitates the movement of the elastic snap-fit member 32.

In an embodiment, the outer housing assembly 10 defines a detachment opening 121, the rotating base 31 is provided with a detachment portion 313, and the detachment portion 313 is disposed in the detachment opening 121. The user can drive the detachable mechanism 30 to rotate through the detachment portion 313, so as to facilitate driving of the detachable mechanism 30, thereby detaching the detachable mechanism 30 from the outer housing assembly 10 or rotating to fix the detachable mechanism 30 to the outer housing assembly 10.

Further, the detachment portion 313 defines a detachment groove 3131. The detachment groove 3131 can be inserted by the user through a flathead screwdriver or a Philips screwdriver, so as to drive the detachable mechanism 30 to rotate, thereby driving the rotating base 31 to rotate and detaching the elastic snap-fit member 32 from the slot 122, so as to achieve detachment of the detachable mechanism 30. Certainly, the structure of the detachment portion 313 is not limited to this. In other embodiments, the detachment portion 313 can be provided with a holding block, so that the user can directly hold the holding block to drive the detachable mechanism 30 to rotate, thereby driving the rotating base 31 to rotate.

In an embodiment, the charging case 100 for wireless earbuds further includes a bushing mechanism 40. The bushing mechanism 40 includes a limiting plate 41, an outer rotating ring 42, a ball 43, and an inner rotating ring 44. The limiting plate 41 is connected to the outer housing 11, the outer rotating ring 42 is disposed in the limiting plate 41, the inner rotary ring 44 is sleeved on the inner housing 21, and is rotatably disposed in the outer rotating ring 42, and the ball 43 is rotatably disposed in the outer rotating ring 42 and abuts against the inner rotating ring 44.

In an embodiment, the rotating base 31 includes a rotating plate 311 and a fixing bracket 312. The elastic snap-fit member 32 is disposed on the rotating plate 311, the fixing bracket 312 covers the rotating plate 311, the fixing bracket 312 is configured to fix the elastic snap-fit member 32, and the rotating shaft 33 is disposed on one side of the fixing bracket 312 away from the rotating plate 311. For example, the detachment portion 313 is disposed on the rotating plate 311 and is located in the detachment opening 121 of the outer housing assembly 10.

In the above embodiment, the elastic snap-fit member 32 includes an elastic member 321 and a snap-fit member 322. The elastic member 321 is fixed to the fixing bracket 312, and the elastic member 321 is connected to one end of the snap-fit member 322. The fixing bracket 312 defines a sliding slot 3121 at one side of the fixing bracket 312 facing the rotating plate 311. The snap-fit member 322 is slidably disposed in the sliding slot 3121, that is, the snap-fit member 322 moves along the sliding slot 3121 under the action of the elastic member 321.

Exemplarily, the elastic member 321 is an elastic piece, and is fixed on the rotating plate 311. The elastic member 321 is configured to drive the snap-fit member 322 to extend out of the rotating plate 311. For example, the elastic member 321 includes a fixing portion 321*a* and an elastic portion 321 *b*. The fixing portion 321*a* is connected to the fixing bracket 312. One end of the elastic portion 321*b* is connected to the fixing portion 321*a*, and the other end of the elastic portion 321*b* is connected to the snap-fit member 322. Specifically, the elastic portion 321*b* may be an elastic piece bent continuously. Further, the elastic portion 321*b* and the fixing portion 321*a* are integrally formed. Of course, in other embodiments, the elastic member 321 may also be a spring, one end of the spring is connected to the fixing bracket 312, and the other end of the spring is connected to the snap-fit member 322. When the fixing bracket 312 defines a positioning groove for installing the spring, and an opening of the positioning groove faces the snap-fit member 322.

In the above embodiment, the elastic member 321 defines a fixing hole 3211, and the fixing bracket 312 is provided with a fixing column 3122. The fixing column 3122 passes through the fixing hole 3211 when the fixing bracket 312 is connected to the rotating plate 311, thereby fixing the elastic member 321.

In an embodiment, the detachable mechanism 30 further includes a fixing member 34, two rotating members 331 rotatably connected to each other are sleeved on the rotating shaft 33. One of the two rotating members 331 is fixedly connected to the fixing bracket 312 through the fixing member 34. The other one of the two rotating members 331 is connected to the inner housing assembly 20.

In an embodiment, the inner housing assembly 20 includes an inner housing 21 and a rotating cap 22. The inner housing 21 is connected to said the other one of the two rotating members 331, and is rotatably disposed in the accommodating cavity 111. The rotating cap 22 is connected to one end of the inner housing 21 away from the rotating shaft 33. The rotating cap 22 is configured to be gripped by a user, so as to facilitate driving the inner housing 21 to rotate in the outer housing assembly 10.

The inner housing 21 defines an earbud cavity 211, and the wireless earbuds are accommodated in the earbud cavity 211.

In some embodiments, the rotating cap 22 is exposed out of the accommodating cavity 111 and located outside the outer housing 11, so as to facilitate use by a user.

Figure 8:
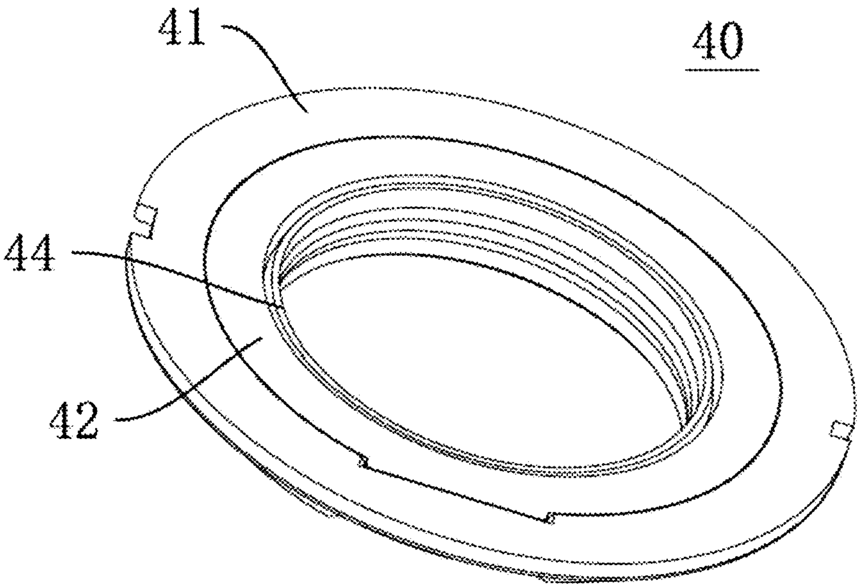
FIG. 8 is a schematic structural view of the bushing mechanism illustrated in FIG. 2.

As illustrated in FIG. 8, in some embodiments, the charging case 100 for wireless earbuds further includes the bushing mechanism 40. The bushing mechanism 40 is disposed between the outer housing assembly 10 and the inner housing assembly 20, and is located at one side of the outer housing assembly 10 away from the detachable mechanism 30.

Because the rotary charging case is long, when the inner housing 21 rotates, both ends of the inner housing 21 need to be limited, and relative rotation stability between the outer housing assembly 10 and the inner housing assembly 20 needs to be achieved. In the charging case 100 for wireless earbuds of the present disclosure, rotation of one end of the inner housing 21 is realized by the rotation of the rotating shaft 33 disposed in the detachable mechanism 30, and rotation of the other end of the inner housing 21 is realized by the rotation of the bushing mechanism 40.

Specifically, as illustrated in FIGS. 9 to 12, the bushing mechanism 40 includes a limiting plate 41, an outer rotating ring 42, a ball 43, and an inner rotating ring 44. The limiting plate 41 is connected to the outer housing 11 and located at an opening of the accommodating cavity 111. The limiting plate 41 is configured to prevent the inner housing 21 from being detached from the accommodating cavity 111. The outer rotating ring 42 is disposed in the position limiting plate 41. The inner rotating ring 44 is sleeved on the inner housing 21 and is rotatably disposed in the outer rotating ring 42. The ball 43 is rotationally disposed in the outer rotating ring 42 and abuts against the inner rotating ring 44.

The inner rotating ring 44 cooperates with the outer rotating ring 42 to allow one end of the inner housing 21 away from the rotating shaft 33 to rotate relative to the limiting plate 41, thereby improving the stability of the inner housing 21 rotating in the outer housing 11. When the inner rotating ring 44 rotates, the ball 43 is rollably fitted with the inner rotating ring 44 to convert the sliding friction between the inner rotating ring 44 and the outer rotating ring 42 into rolling friction, thereby reducing the friction between the outer rotating ring 42 and the inner rotating ring 44, improving hand feeling during rotation, and reducing noise during rotation.

In some embodiments, the limiting plate 41 and the outer rotating ring 42 are fixed by glue dispensing.

In some embodiments, the inner rotating ring 44 defines a limiting groove 441, and the ball 43 abuts against a wall of the limiting groove 441, so that the outer rotating ring 42 and the inner rotating ring 44 are axially limited by the ball 43.

In some embodiments, the inner rotating ring 44 is fixed on the inner housing 21 through interference fitting.

Figure 3:
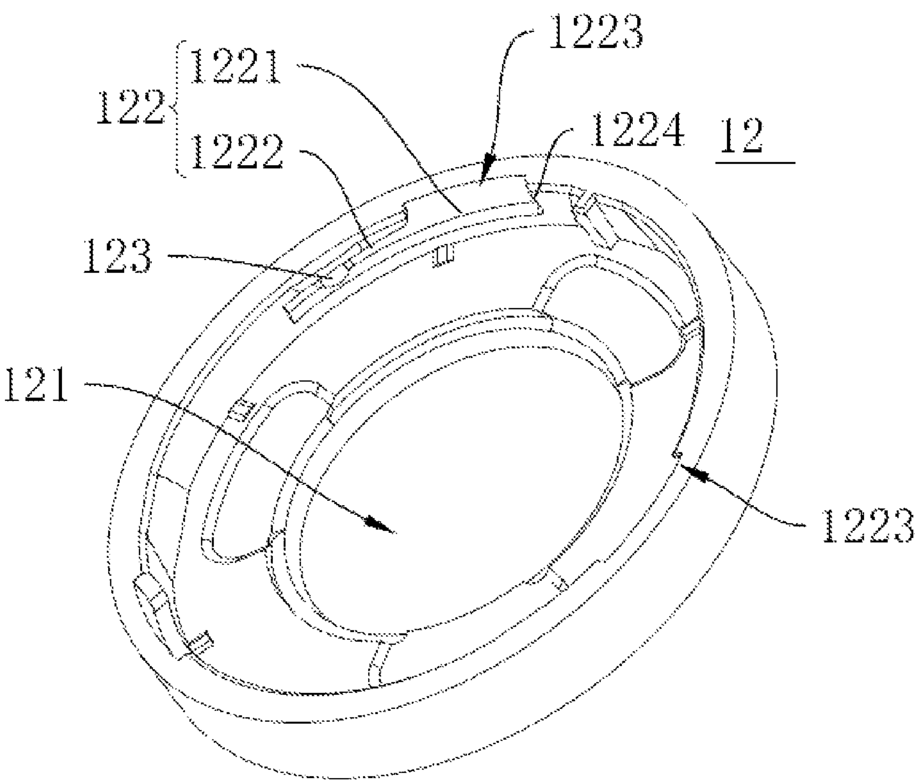
FIG. 3 is a schematic structural view of the decoration member of the outer housing assembly illustrated in FIG. 2.
Figure 4:
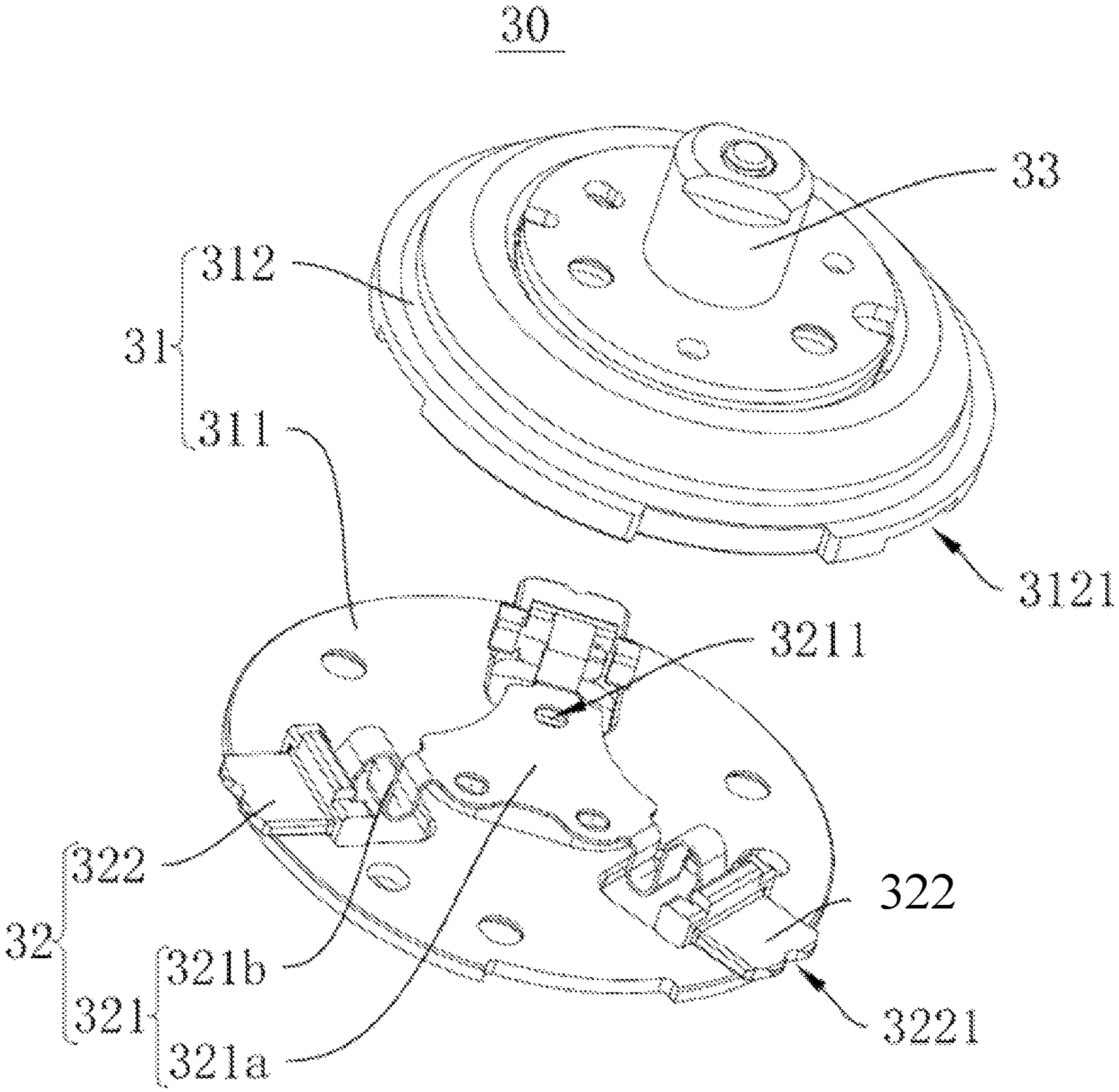
FIG. 4 is a partial exploded schematic structural view of the dismantlement mechanism illustrated in FIG. 2, viewed from another direction.
Figure 5:
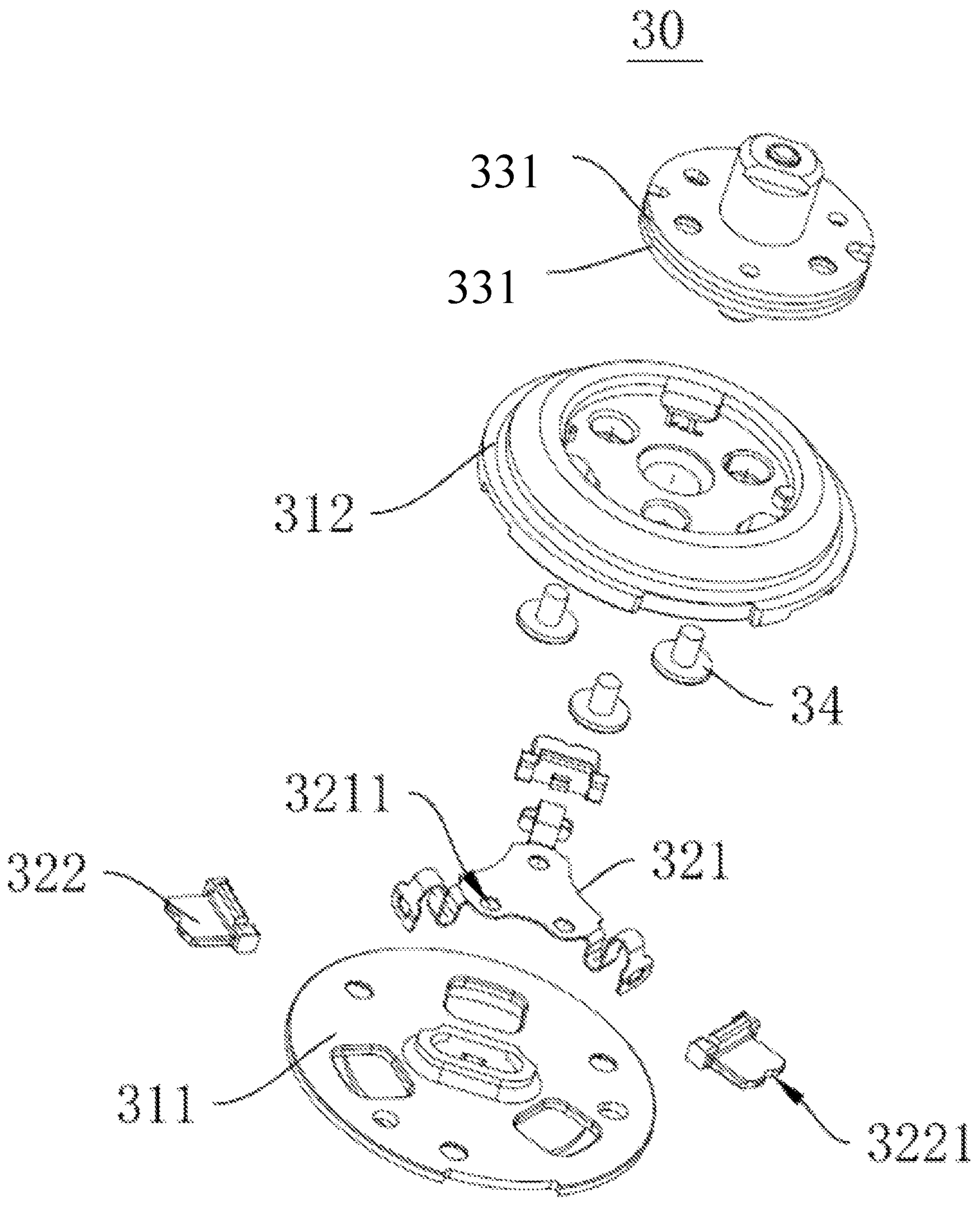
FIG. 5 is an exploded schematic structural view of the detachable mechanism illustrated in FIG. 4.
Figure 6:
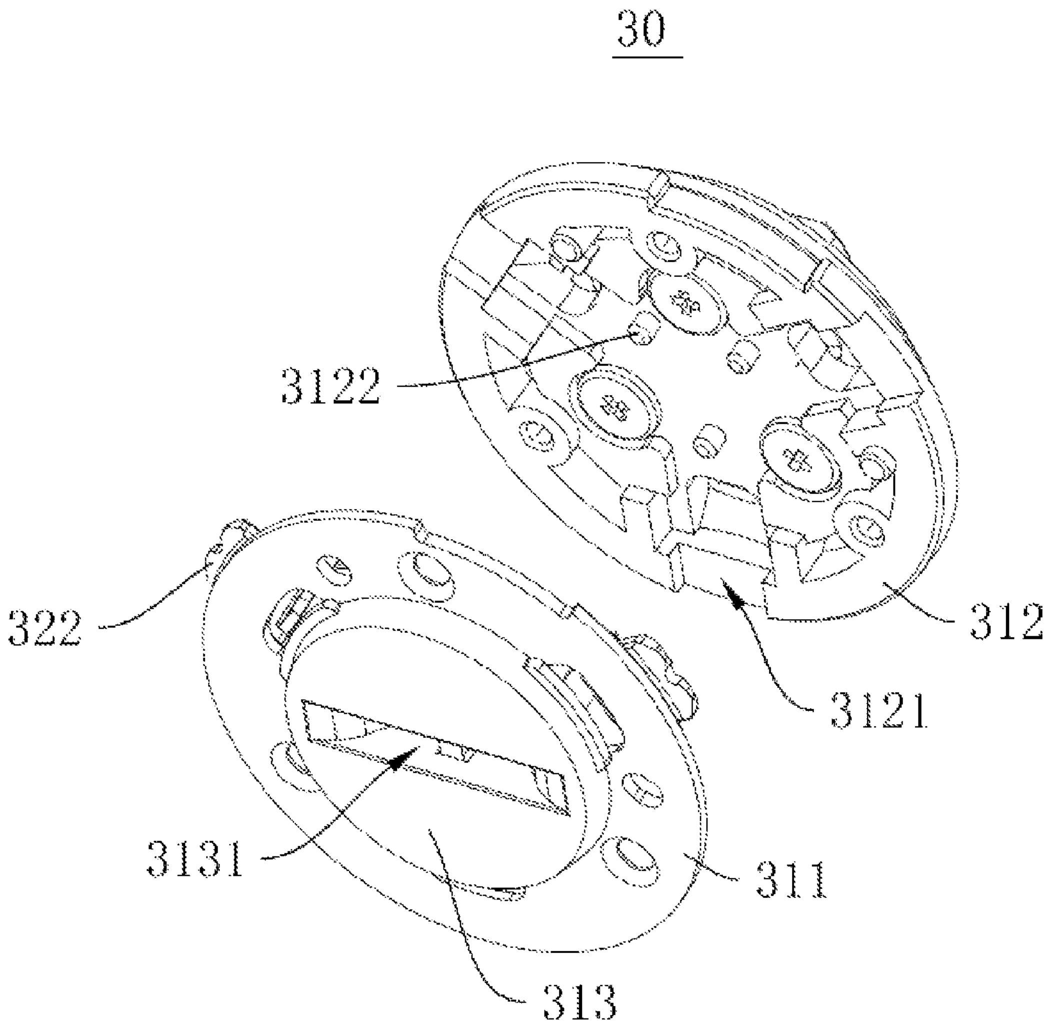
FIG. 6 is a schematic structural view of the detachable mechanism illustrated in FIG. 4, viewed from another direction.
Figure 7:
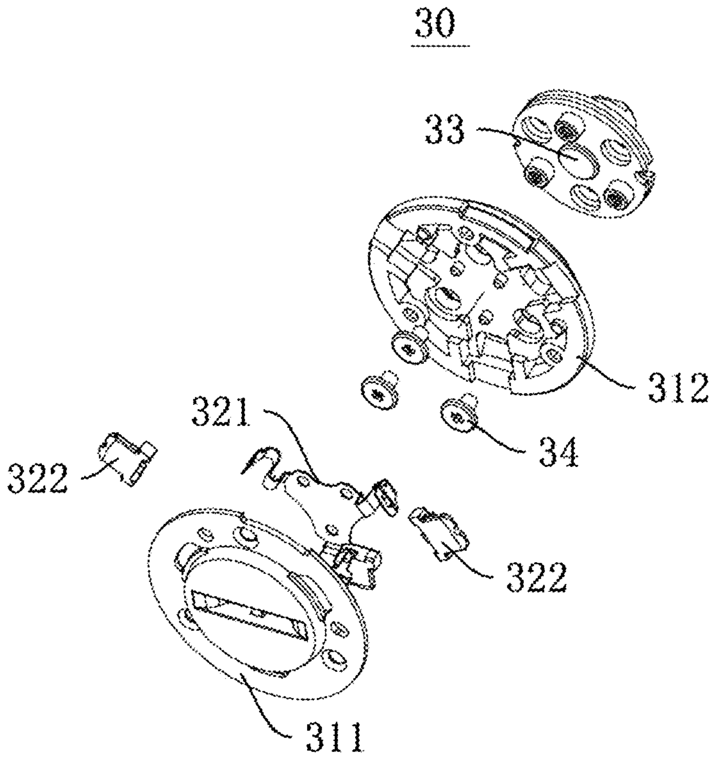
FIG. 7 is an exploded schematic structural view of the detachable mechanism illustrated in FIG. 6.

As illustrated in FIG. 3, in an embodiment, the outer housing assembly 10 includes an outer housing 11 and an annular decoration member 12, the annular decoration member 12 is fixed to one end of the outer housing 11 away from the bushing mechanism 40, and the slot 122 is defined in the annular decoration member 12. The annular decoration member 12 can improve the aesthetic effect of the product.

As an example, the outer housing 11 is substantially cylindrical. The outer housing 11 defines an accommodating cavity 111. The inner housing assembly 20 and the detachable mechanism 30 are disposed in the accommodating cavity 111 from the other end of the accommodating cavity 111.

The outer housing 11 further defines an accommodating opening 112 in the side wall of the outer housing 11, and the accommodating opening 112 is communicated with the accommodating cavity 111. The accommodating opening 112 is used for a user to pick and place wireless earbuds accommodated in the inner housing assembly 20.

Further, the outer housing 11 and the annular decoration member 12 are integrally formed by two-color injection molding. By means of two-color injection molding, on the one hand, the production and manufacture of the outer housing assembly 10 are facilitated, the production efficiency is improved, and at the same time, the integrated forming also ensures the connection strength between the outer housing 11 and the annular decoration member 12; and on the other hand, the differentiation between the outer housing 11 and the annular decoration member 12 is facilitated. Of course, in other embodiments, the annular decoration member 12 may also be fixed to the outer housing 11 by other connection means.

It can be noted that, in other embodiments, the outer housing assembly 10 may not include the annular decoration member 12, that is, the outer housing assembly 10 is directly formed by the outer housing 11.

In an embodiment, the charging case 100 for wireless earbuds further includes a magnetic assembly 50. The magnetic assembly 50 is used for performing magnetic positioning on the outer housing assembly 10 and the inner housing assembly 20, so that the inner housing assembly 20 can be automatically returned after being rotated, thereby improving the use experience of a user.

Figure 13:
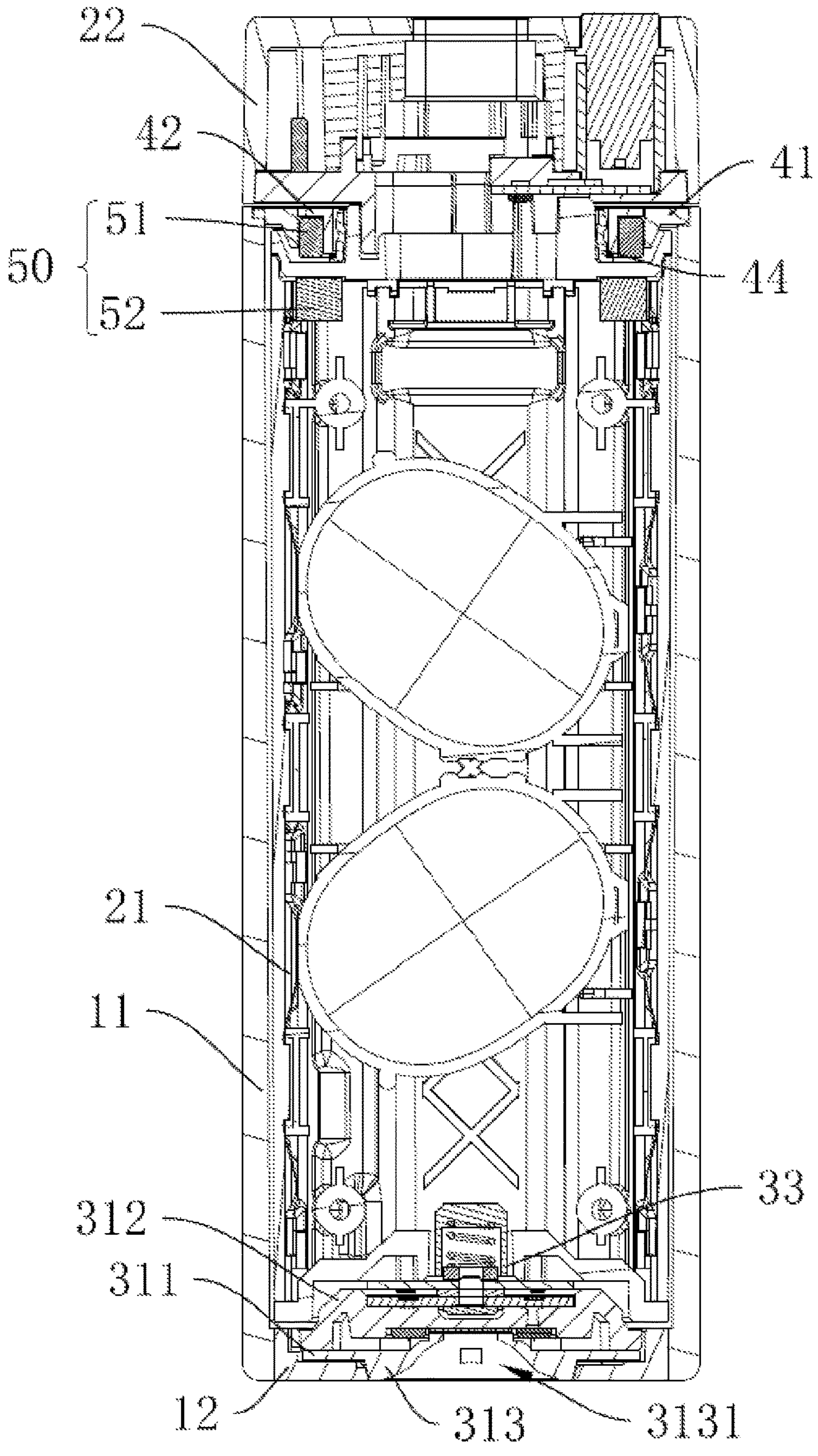
FIG. 13 is a cross-sectional view of the charging case for wireless earbuds illustrated in FIG. 1.

Specifically, as illustrated in FIG. 13, the magnetic assembly 50 includes a first magnetic member 51 and a second magnetic member 52. The first magnetic member 51 is disposed on the bushing mechanism 40. The second magnetic member 52 is disposed on the inner housing 21 and opposite to the first magnetic member 51. The first magnetic member 51 and the second magnetic member 52 can be in magnetic fit with each other, thereby realizing automatic return of the inner housing 21.

Specifically, when the inner housing assembly 20 is rotated, when the first magnetic member 51 rotates to be close to the second magnetic member 52, the magnetic force between the first magnetic member 51 and second magnetic member 52 drives the entire inner housing assembly 20 to return due to large magnetic force between the first magnetic member 51 and second magnetic member 52 and small friction force between the outer housing 11 and the inner housing 21, thereby producing an automatic return effect.

Figure 9:
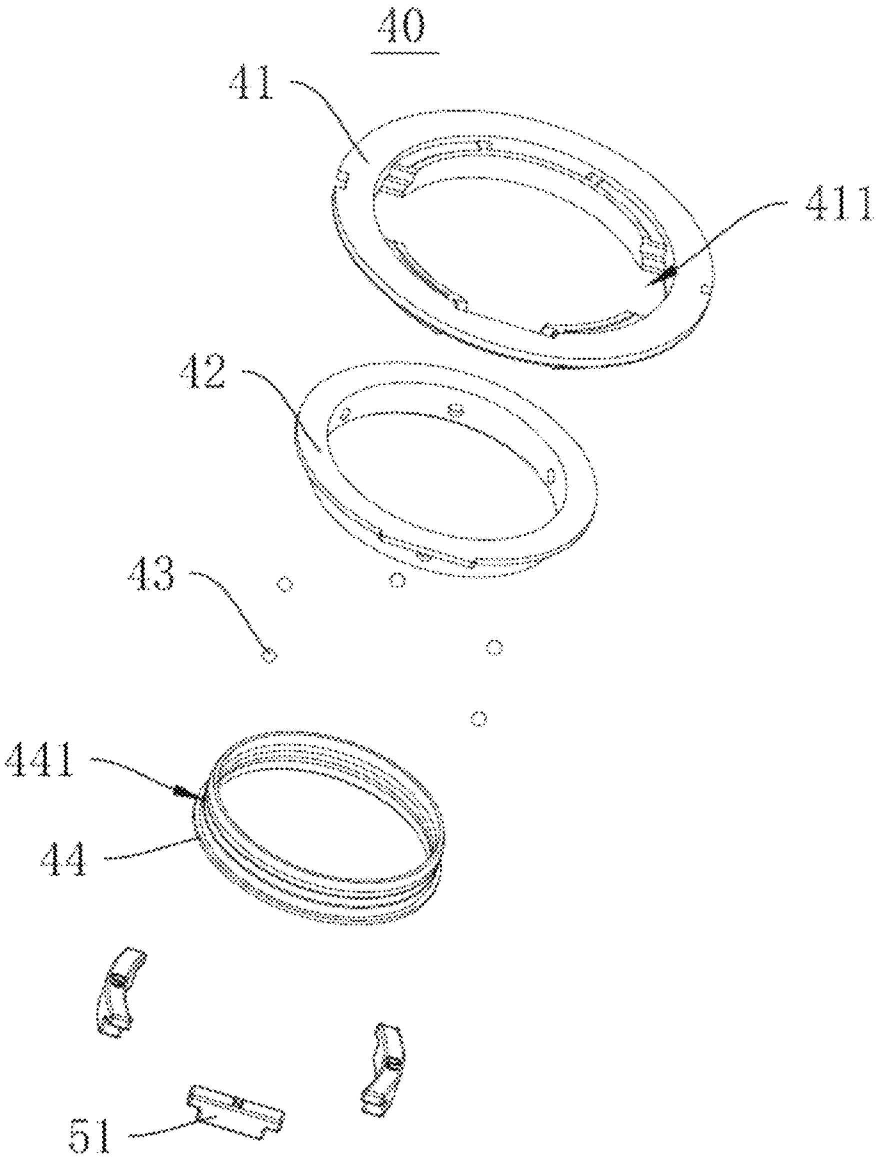
FIG. 9 is an exploded schematic structural view of the bushing mechanism illustrated in FIG. 8.
Figure 10:
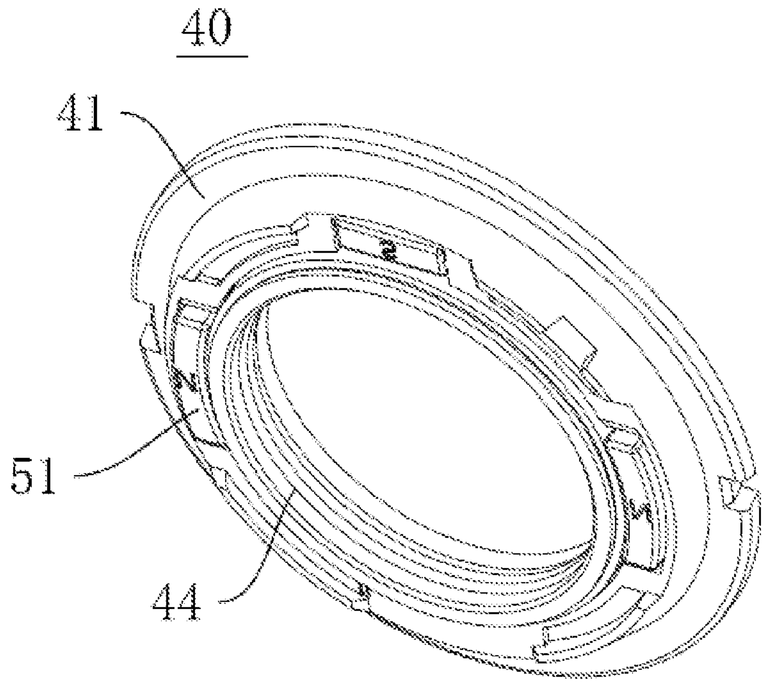
FIG. 10 is a schematic structural view of the bushing mechanism illustrated in FIG. 8, viewed from another direction.
Figure 11:
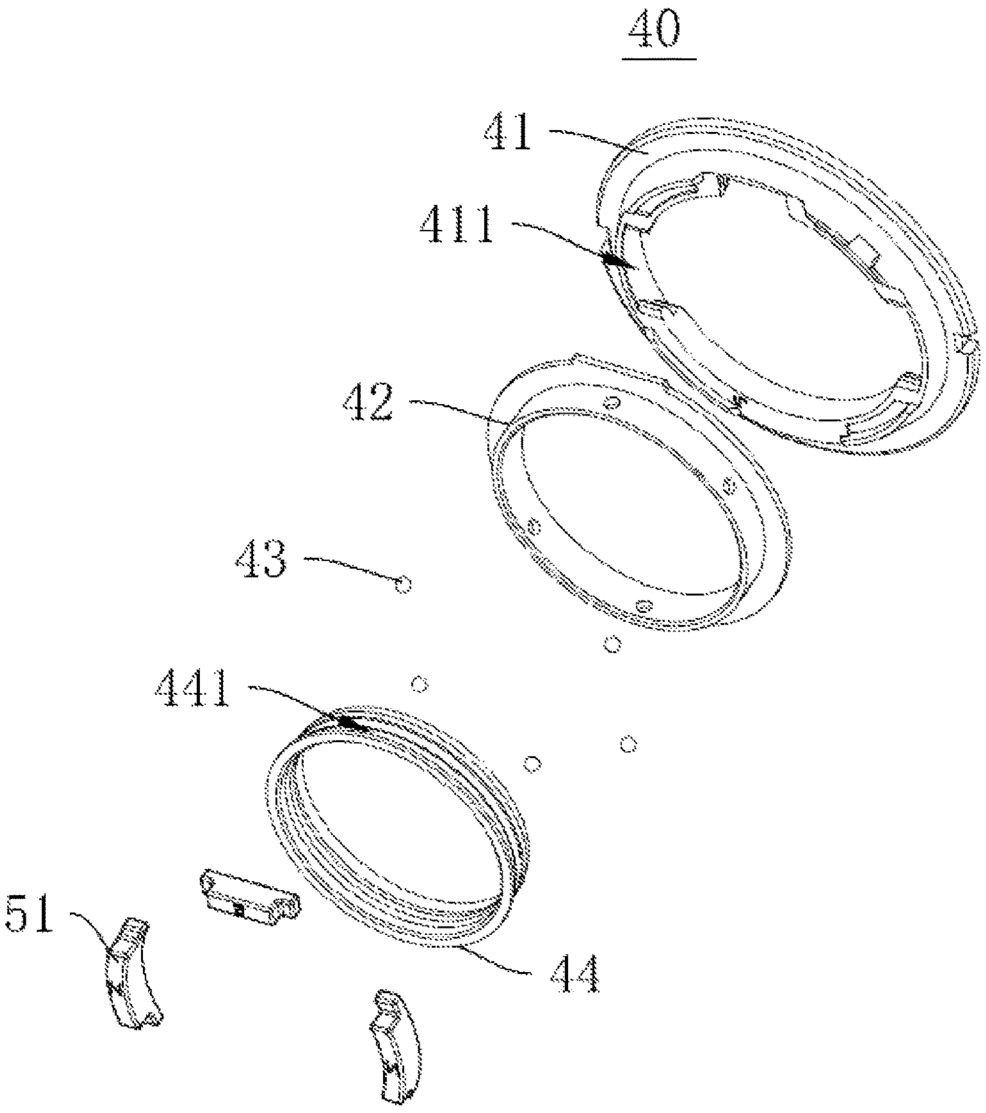
FIG. 11 shows an exploded schematic structural view of the bushing mechanism illustrated in FIG. 10.
Figure 12:
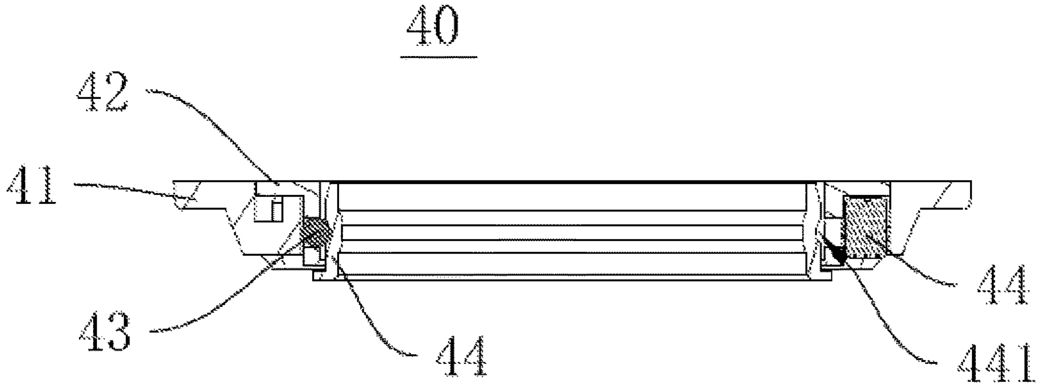
FIG. 12 is a cross-sectional view of the bushing mechanism illustrated in FIG. 8.

As illustrated in FIG. 9, in an embodiment, the limiting plate 41 defines a fixing slot 411, and the first magnetic member 51 is disposed in the fixing slot 411.

In conclusion, in the charging case 100 for wireless earbuds provided in embodiments of the present disclosure, the elastic snap-fit member 32 of detachable mechanism 30 inserts into the slot 12, such that the detachable mechanism 30 is engaged with and fixed to the outer housing assembly 10. The elastic member 321 of the elastic snap-fit member 32 applies a continuous pushing force to the snap-fit member 322, to restrict the relative rotation between the detachable mechanism 30 and the outer housing assembly 10. In addition, the detachment portion 313 can be in fit with the detachment opening 121, further limiting axial movement of the detachable mechanism 30. When the rotating plate 311 rotates by a certain angle, the snap-fit member 322 can move in the slot 122 to the opening 1223 of the slot 122, so that the detachable mechanism 30 and the inner casing 21 can be extracted from the outer housing assembly 10, thereby realizing the detachment function, facilitating the user to clean the internal space of the charging case 100 for wireless earbuds, improving the device delicacy, and improving the user experience.

Embodiment 2

As illustrated in FIGS. 1 to 13, a wireless earbud assembly is provided in this embodiment, the wireless earbud assembly is configured to be used in cooperation with other electronic devices, so as to implement functions such as wireless audio playing and voice calling.

The wireless earbud assembly includes wireless earbuds and the charging case 100 for wireless earbuds described in embodiment 1. The wireless earbuds are placed in the inner case assembly 20.

The reference term "an embodiment", "some embodiments", "implementation", "specific implementation", or "some implementations" referred to herein means that a particular feature, structure, material, or characteristic described in conjunction with the embodiment or implementation may be contained in at least one embodiment or implementation of the present disclosure. The phrase appearing in various places in the specification does not necessarily refer to the same embodiment or implementation. The particular feature, structure, material, or characteristic described may be properly combined in any one or more embodiments or implementations. In addition, when the embodiment or implementation is not mutually exclusive with other embodiments or implementations, it is expressly and implicitly understood by those skilled in the art that an embodiment described herein may be combined with other embodiments or implementations.

Although embodiments of the present disclosure have been illustrated and described above, it can be understood that the above embodiments are exemplary and cannot be understood as limitations to the present disclosure. Those of ordinary skill in the art can change, amend, replace, and modify the above embodiments within the scope of the present disclosure, and these modifications and improvements are also regarded as the protection scope of the present disclosure.

What is claimed is:

1. A charging case for wireless earbuds, comprising:
an inner housing;
an outer housing assembly configured to rotate relative to the inner housing, the outer housing assembly defining a slot; and
a detachable mechanism, comprising a rotating base, an elastic snap-fit member, and a rotating shaft, wherein the rotating base is at least partially exposed outside the outer housing assembly, the rotating shaft is connected to the rotating base and is rotatably connected to the inner housing, and the elastic snap-fit member is disposed on the rotating base;
wherein when the rotating base rotates by a first angle, the elastic snap-fit member rotates out of the slot, and the outer housing assembly and the inner housing are detachable; or when the rotating base rotates by a second angle, the elastic snap-fit member and the slot are snap-fitted, and the outer housing assembly and the inner housing are not detachable.

2. The charging case for wireless earbuds of claim 1, wherein the slot is implemented as a plurality of slots, the plurality of slots are defined on the outer housing assembly along a circumferential direction of the rotating base, and the number of the elastic snap-fit members is equal to the number of slots.

3. The charging case for wireless earbuds of claim 2, wherein the slot is implemented as three slots, and the three slots are defined on the outer housing assembly at equal intervals along the circumferential direction of the rotating base; and the elastic snap-fit member is implemented as three elastic snap-fit members, and a position of each elastic snap-fit member corresponds to one slot.

4. The charging case for wireless earbuds of claim 2, wherein the slot comprises a first slot and a second slot which are connected and orthogonal to each other, one end of the first slot extends to define an opening, the elastic snap-fit member is configured to move out of the slot from the opening, the other end of the first slot is connected to one end of the second slot; and the first slot is provided with a limiting portion on a slot wall of the first slot relative to the second slot, and the limiting portion is configured to stop the elastic snap-fit member from rotating continuously.

5. The charging case for wireless earbuds of claim 4, wherein the elastic snap-fit member defines a snap-fit opening, and the second slot is provided with a snap-fit block in fit with the snap-fit opening on a wall surface of the second slot away from the first slot.

6. The charging case for wireless earbuds of claim 1, wherein the slot is implemented as one slot, the slot is an annular slot, and the annular slot defines an opening for the elastic snap-fit member to move out of the annular slot.

7. The charging case for wireless earbuds of claim 1, wherein the outer housing assembly defines a detachment opening, the rotating base is provided with a detachment portion, and the detachment portion is disposed in the detachment opening.

8. The charging case for wireless earbuds of claim 7, wherein the detachment portion defines a detachment groove, and the detachment groove is in a linear or cross shape.

9. The charging case for wireless earbuds of claim 1, wherein the rotating base comprises a rotating plate and a fixing bracket, the elastic snap-fit member is deposed on the rotating plate, the fixing bracket covers the rotating plate, the fixing bracket is configured to fix the elastic snap-fit member, and the rotating shaft is disposed on one side of the fixing bracket away from the rotating plate.

10. The charging case for wireless earbuds of claim 9, wherein the elastic snap-fit member comprises an elastic member and a snap-fit member, the elastic member is fixed to the fixing bracket, the elastic member is connected to one end of the snap-fit member, the fixing bracket defines a sliding slot on one side of the fixing bracket facing the rotating plate, and the other end of the snap-fit member is slidably disposed in the sliding slot.

11. The charging case for wireless earbuds of claim 9, wherein the elastic member comprises a fixing portion and an elastic portion, the fixing portion is connected to the fixing bracket; one end of the elastic portion is connected to the fixing portion, and the other end of the elastic portion is connected to the snap-fit member.

12. The charging case for wireless earbuds of claim 10, wherein the elastic member defines a fixing hole, the fixing bracket is provided with a fixing column, and the fixing column passes through the fixing hole to fix the elastic member.

13. The charging case for wireless earbuds of claim 10, wherein the detachable mechanism further comprises a fixing member, two rotating members rotatably connected to each other are sleeved on the rotating shaft, one of the two rotating members is fixedly connected to the fixing bracket through the fixing member, and the other one of the two rotating members is connected to the inner housing.

14. The charging case for wireless earbuds of claim 1, further comprising a rotating cap, wherein the rotating cap is connected to one end of the inner housing away from the rotating shaft.

15. The charging case for wireless earbuds of claim 1, further comprising a bushing mechanism, wherein the bushing mechanism comprises a limiting plate, an outer rotating ring, a ball, and an inner rotating ring, the limiting plate is connected to the outer housing assembly, the outer rotating ring is disposed in the limiting plate, the inner rotating ring is sleeved on the inner housing and is rotatably disposed in the outer rotating ring, and the ball is rotatably disposed in the outer rotating ring and abuts against the inner rotating ring.

16. The charging case for wireless earbuds of claim 15, further comprising a magnetic assembly, wherein the magnetic assembly comprises a first magnetic member and a second magnetic member in magnetic fit with each other, the first magnetic member is disposed on the bushing mechanism, and the second magnetic member is disposed on the inner housing and opposite to the first magnetic member.

17. The charging case for wireless earbuds of claim 15, wherein the inner rotating ring defines a limiting groove, and the ball abuts against a groove wall of the limiting groove.

18. The charging case for wireless earbuds of claim 15, wherein the outer housing assembly comprises an outer housing and an annular decoration member, the annular decoration member is fixed to one end of the outer housing away from the bushing mechanism, the slot is disposed in the annular decoration member, and the limiting plate is connected to the outer housing.

19. The charging case for wireless earbuds of claim 18, wherein the outer housing and the annular decoration member are integrally formed through two-color injection molding.

20. A wireless earbud assembly, comprising wireless earbuds and a charging case for wireless earbuds, the charging case for wireless earbuds comprising:

an inner housing;

an outer housing assembly configured to rotate relative to the inner housing, the outer housing assembly defining a slot; and a detachable mechanism, comprising a rotating base, an elastic snap-fit member, and a rotating shaft, wherein the rotating base is at least partially exposed outside the outer housing assembly, the rotating shaft is connected to the rotating base and is rotatably connected to the inner housing, and the elastic snap-fit member is disposed on the rotating base;

wherein when the rotating base rotates by a first angle, the elastic snap-fit member rotates out of the slot, and the outer housing assembly and the inner housing are detachable; or when the rotating base rotates by a second angle, the elastic snap-fit member and the slot are snap-fitted, and the outer housing assembly and the inner housing are not detachable.

* * * * *